United States Patent [19]
Appleford et al.

[11] Patent Number: 5,114,117
[45] Date of Patent: May 19, 1992

[54] CONNECTOR FOR FLUID CARRYING CONDUITS

[75] Inventors: David E. Appleford, Theydon Bois, Great Britain; Colin G. Millum, Aberdeen, Scotland; Duncan M. Scott, Aberdeen, Scotland; Michael J. Rimmer, Aberdeen, Scotland

[73] Assignee: Scottish Development Agency, Glasgow, Scotland

[21] Appl. No.: 469,560

[22] PCT Filed: Sep. 23, 1988

[86] PCT No.: PCT/GB88/00782
§ 371 Date: May 11, 1990
§ 102(e) Date: May 11, 1990

[87] PCT Pub. No.: WO89/03002
PCT Pub. Date: Apr. 6, 1989

[30] Foreign Application Priority Data
Sep. 25, 1987 [GB] United Kingdom ............... 8722562

[51] Int. Cl.⁵ ................................ F16L 37/28
[52] U.S. Cl. ...................... 251/149.9; 137/236.1; 285/26; 285/137.1; 166/341
[58] Field of Search ............ 285/25, 26, 137.1, 920; 137/614.06, 236.1; 251/149.9, 149.5; 166/341, 344

[56] References Cited
U.S. PATENT DOCUMENTS

| | | | |
|---|---|---|---|
| 3,326,579 | 6/1967 | Fowler | 285/26 |
| 3,551,005 | 12/1970 | Brun | 166/341 |
| 3,820,600 | 6/1974 | Baugh | 285/26 |
| 4,069,842 | 1/1978 | Steydle et al. | 137/614.06 |
| 4,080,025 | 3/1978 | Garnier et al. | 251/149.5 |
| 4,219,223 | 8/1980 | Schulte | 285/26 |
| 4,408,929 | 10/1983 | Baugh | 285/26 |
| 4,411,454 | 10/1983 | Nayler et al. | 285/26 |
| 4,460,156 | 7/1984 | Hazelrigg et al. | 166/341 |
| 4,648,629 | 3/1987 | Baugh | 285/920 |
| 4,688,633 | 8/1987 | Barkley | 166/341 |

Primary Examiner—A. Michael Chambers
Attorney, Agent, or Firm—Biebel & French

[57] ABSTRACT

A connector for use in connecting and disconnecting fluid carrying conduits, for example in an offshore installation, is of the "plug and socket" type, which comprises cooperating parts in the form of a female part (10) to be mounted for example to a subsea module and a complementary male part (11) over which the female part (10) fits. Each of the female and male parts are provided with a plurality of bores (12) and (13) respectively; with the bores (13) being for connection to fluid carrying conduits. Tapered cylindrical sleeves (14) and (15) are provided on the female and male parts respectively and have respective ports (16) and (17) for intercommunicating respective ones of the bores (12) and (13) as shown in (right-hand side as illustrated) to permit fluid flow through the communicated bores and thus through the connector, and for discommunicating the bores (12) and (13) to stop fluid flow through the bores (12) and (13) and thus through the connector (left-hand side as illustrated), in which position the two parts (10, 11) can be disconnected.

13 Claims, 8 Drawing Sheets

CONNECTOR FOR FLUID CARRYING CONDUITS

BACKGROUND OF THE INVENTION

The present invention relates to a connector for use in connecting and disconnecting fluid carrying conduits such as pipe lines and flow lines for example for use with oil and/or gas, more particularly but not exclusively in subsea locations where for example it is necessary to connect and disconnect such conduits to and from subsea production modules and pipelines.

The increasing use of modularisation for subsea systems has been brought about by the need to reduce subsea installation and maintenance time. The idea of easily interchangeable modules creates a need, therefore, for a suitable "connector". Current connector designs are both costly and complicated, with consequent lack of reliability.

Past and present methods employed in the North Sea have connected/disconnected these modules using multi-datum connections. These methods, which rely on a multitude of alignment datums go against basic engineering design principles, which call for the minimum of datums when connecting/disconnecting two or more components.

Further, to actually connect and disconnect these multi-datum modules, large forces have often been required to spring pipework into alignment, often resulting in the subsequent damage of seals or housings, resulting in production down times. Thermal expansion will also exert undue forces within the connections.

One example of an existing multi-connection subsea module, presently being used in the North Sea consists of approx 20 individual connectors, relying on costly jigs and fixtures to ensure connection integrity. Further, valving is required at each side of the connection for containment of fluids. Basically this means that for each connector interface, a pair of shut-off valves is required which is costly and reduces reliability of the system.

Thus, in Applicant's view, a connector system which does not have the disadvantages of the known multi-connection subsea module has become an essential component in any system of modularisation for subsea oil field development. Previous pressure on the oil companies to look for the new methods of field development has been greatly increased by the recent fluctuations in oil price. The consequence is that, having got over the initial shock, many oil companies are currently planning the next, new series of mainly smaller field developments. These will contain much of the new approach to matters such as modularisation and connections. It is very important, therefore, that a suitable connector will be available to the oil companies.

Another main area identified by the Applicants for use of such a connector is a QCDC (Quick Connect/Disconnect) for a flexible riser system on an FPV (Floating Production Vessel). The flexible riser system between the subsea installation and the FPV requires a connector which provides a connection at the FPV which can be quickly uncoupled or jettisoned in the event of the FPV moving off-station during emergency situations.

Accordingly, the main object of the present invention is to provide a connector which not only overcomes the aforementioned disadvantages of connection/disconnection and the need for external shut-off valves but also provides increased reliability at a price which may be reduced down to as little as approximately a quarter of the price of current connector systems.

SUMMARY OF THE INVENTION

To this end, the present invention consists in a connector for use in connecting and disconnecting fluid carrying conduits, said connector comprising two interconnectable parts, each of which is provided with a plurality of bores, and characterized in that it includes means for communicating and discommunicating the bores of one part with respective ones of the bores of the other part when the two are interconnected, the bore communicating and discommunicating means being rotatably movable, such that when said means are in one position the bores of the parts are communicated with each other to permit fluid flow through the bores and thus through the connector, and when said means are rotated to another position the bores of the parts are discommunicated from each other to stop fluid flow through the bores and thus the connector and said parts are disconnectable from each other.

By means of the present invention, all the connections and valves appertaining to the connection of the existing subsea production modules can be replaced by a single datum multi-bore connector requiring only one connection operation which can be carried out under diverless conditions by remote control or by suitable underwater robots, remote maintenance systems (RMS), or remotely operated vehicles (ROV). By operating the means for communicating and discommunicating the bores, it is simple and easy to achieve flow when the two parts are connected and stoppage of flow prior to disconnection such that disconnection of the two parts can only occur when the bores are discommunicated and flow through the connector has been stopped. Thus, the bore communicating and discommunicating means act, in effect, as a single internal valve contained within the two parts of the connector which provides pressure integrity at each side of the break between the connector parts.

Although the connector parts may be provided with any appropriate number of bores to suit individual requirements, in one embodiment it is proposed to provide each part with 10 bores.

Preferably, the bore communicating and discommunicating means comprises a first sleeve on one part and a second sleeve on the other part, each of said sleeves being provided with ports, the sleeves when the two parts are connected being interlinked for rotation, with respective ones of the ports of the sleeves being aligned with each other, such that, when the sleeves are turned together to a first position, the aligned ports align with respective ones of the bores of the two parts to permit fluid flow through the connector and which, when turned to a second position, are disaligned with said respective ones of the bores of the two parts to stop fluid flow through the connector and permit disconnection of the parts.

To achieve satisfactory sealing of the bores and ports of the bore communicating/discommunicating means, the connector includes sealing means which ensure that seals are maintained around the bores of each part during communication and discommunication of the said bores.

In a preferred embodiment of the sealing means of each part, a seal is provided between each bore and the sleeve port aligned therewith during connection of the parts, which seal is of such a shape, for example pear-shaped or tear-drop shaped, so as to encompass also both the bore and the port when in their disaligned position. The sealing means of each part also preferably includes at least one annular seal around each of the bores. At least one annular seal is also preferably provided around each of the sleeve ports of one of the parts to provide seals between the aligned ports of the sleeves during connection of the parts.

Advantageously, the connector includes a latching mechanism for interengaging the two parts and providing a predetermined force which pulls together the said parts during connection thereof.

In a preferred embodiment of the latching mechanism, one part is provided with cam-shaped projections which engage by rotation during connection of the parts with lugs provided on the other part, the lugs being under tension, by way of for example tension rods, such that engagement of the projections with the lugs pulls the two parts together.

Advantageously, the connector is of the "plug and socket" type having complementary male and female parts, with the female part, in the case where the connector is used with an offshore production module, being located on the module and the male part being connected to the fluid carrying conduits.

Preferably, in order to facilitate entry of the male part into the female part to connect the two parts of the connector together, the outer surface of the sleeve of the male part is inwardly tapered or flared and engages with an outwardly tapered or flared surface on the sleeve of the female part. Advantageously, the taper is as slight as possible in order to contain working pressure within the connector and to minimise parting forces between the parts.

Fixing of the two sleeves with respect to each other to render them fast for turning may be achieved in any convenient manner such as by means of splines or a key in a slot.

The bore communicating/discommunicating means may be turned in any suitable manner such as mechanically, hydraulically, or electrically.

BRIEF DESCRIPTION OF THE DRAWINGS

In order that the invention may be more readily understood, an embodiment thereof will now be described, by way of example, with reference to the accompanying drawings, in which.

DESCRIPTION OF THE PREFERRED EMBODIMENT

Figure 1:
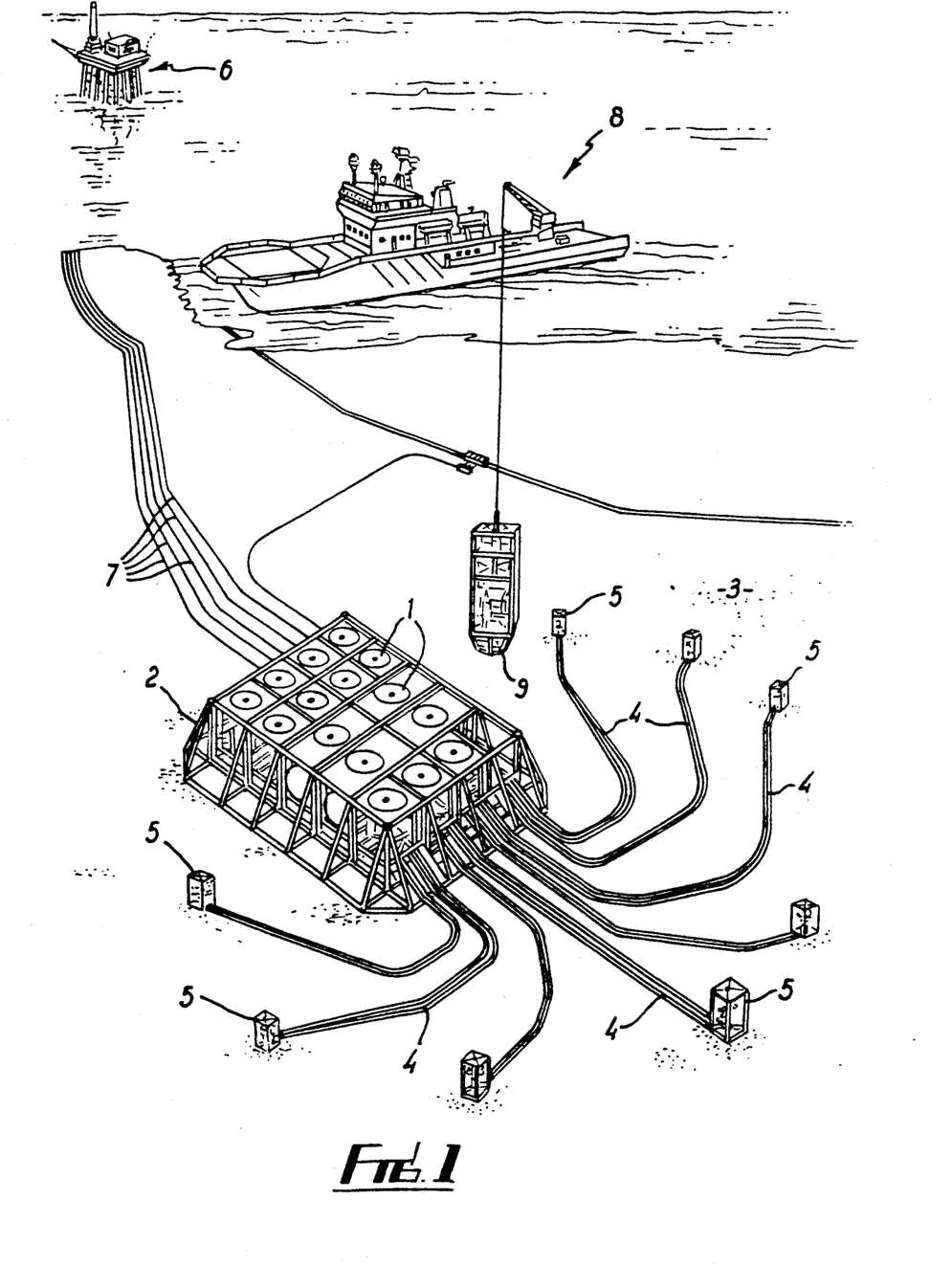
FIG. 1 is an artist's view illustrating one application of connectors, constructed in accordance with the invention, in an offshore oil production system.

Referring to FIG. 1, an offshore oil installation comprises a plurality of subsea production modules 1, which are separately supported within a framework 2 on the seabed 3 and are arranged to collect, via conduits 4, separate and convey oil, gas and water from oil wells 5 to a surface oil rig 6 via conduits 7. In order to connect the flow lines 4 and 7 to the oil production modules 1, which may be lowered into or removed from the framework 2 by a vessel 8, each module is provided with a connector which is illustrated in FIGS. 3 to 9 and generally indicated by the reference 9.

Figure 2:
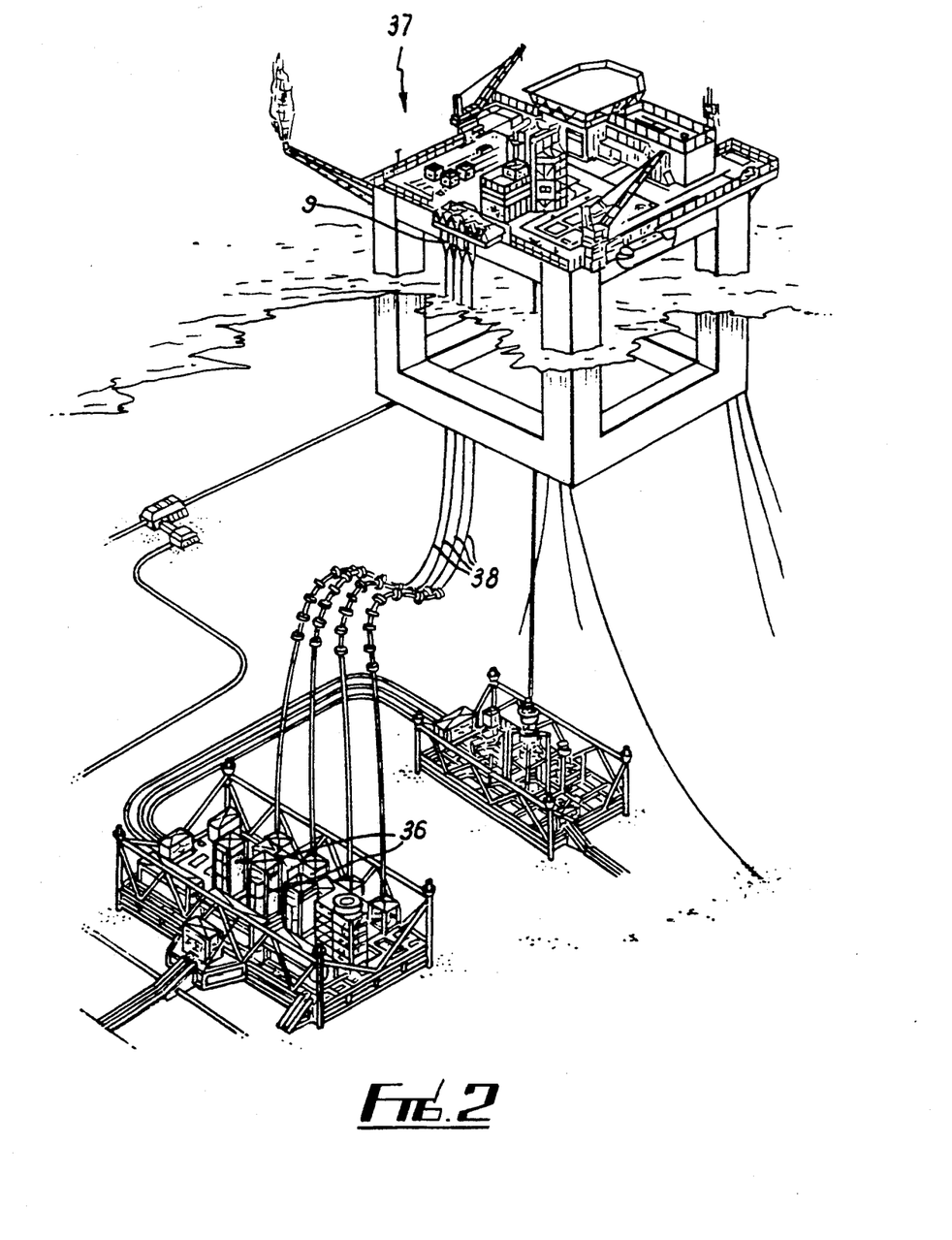
FIG. 2 is an artist's view illustrating another application of the connectors in another offshore oil production system.
Figure 3:
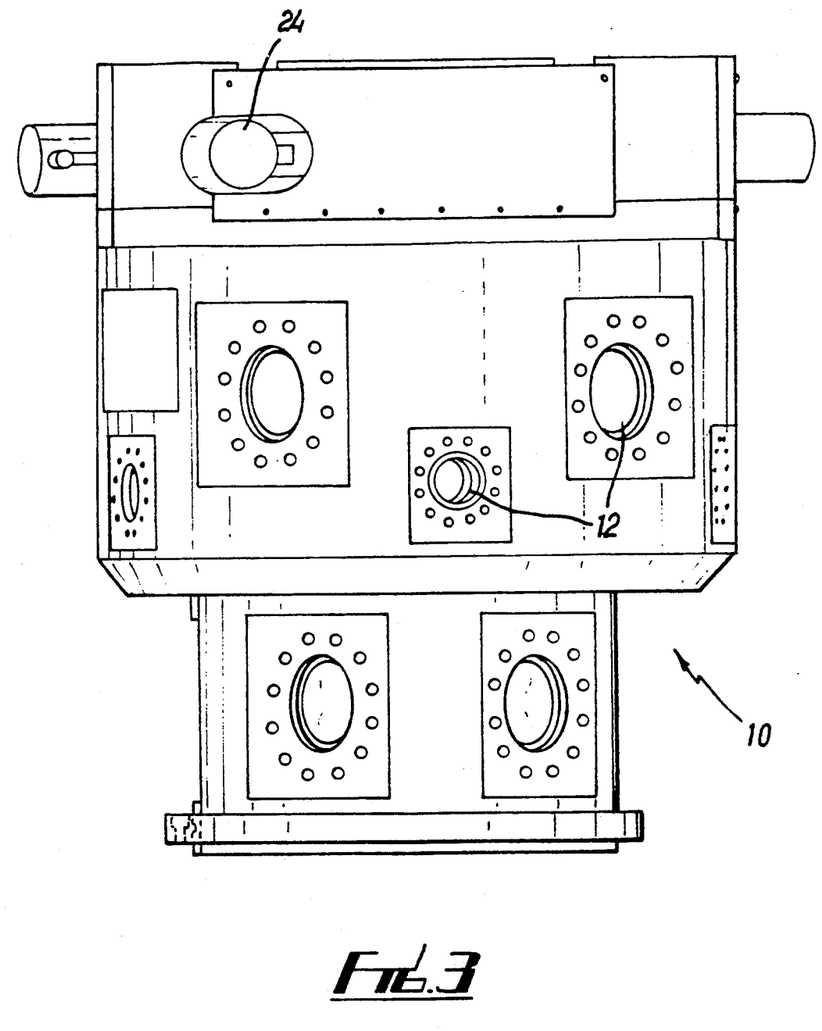
FIGS. 3 and 4 are side elevations of cooperating male and female parts of a connector such as is used in FIGS. 1 and 2.
Figure 4:
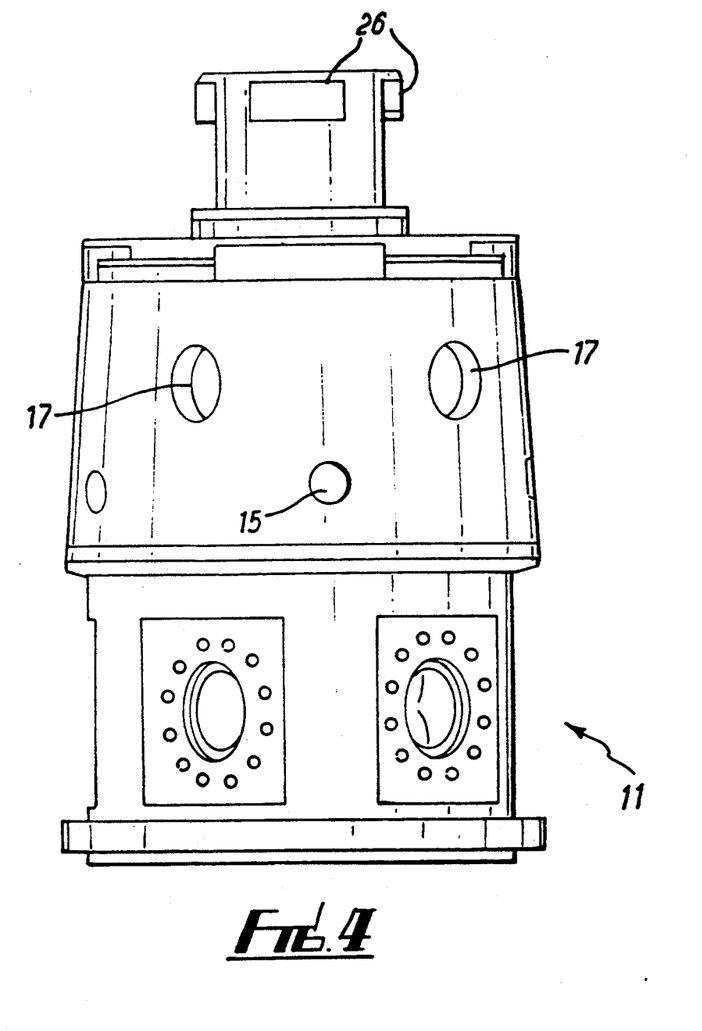

In FIG. 2, another application of the connector 9 is shown, wherein a plurality of subsea production modules 36 are connected to a semi-submersible floating platform 37 by flexible conduits 38. Each of the conduits 38 are connected at platform level by one of the connectors 9 to provide quick connection/disconnection of the conduits from the platform if necessary. The connector 9 is of the "plug and socket" type which comprises cooperating parts in the form of a female part 10 to be mounted for example to a subsea module and a complementary male part 11 over which the female part 10 fits as shown in FIG. 5, each of the female and male parts being provided with a plurality of bores 12 and 13 respectively with the bores 13 being for connection to fluid carrying conduits such as 4 (FIG. 1) and there being means constituted by tapered cylindrical sleeves 14 and 15 on the female and male parts respectively provided with respective ports 16 and 17 for communicating respective ones of the bores 12 and 13 as shown in FIGS. 5 and 6 (right-hand side as illustrated) to permit fluid flow through the communicated bores and thus through the connector 9 and for discommunicating the bores 12 and 13 to stop fluid flow through the bores 12 and 13 and thus through the connector 9 (left-hand side as illustrated).

Figure 5:
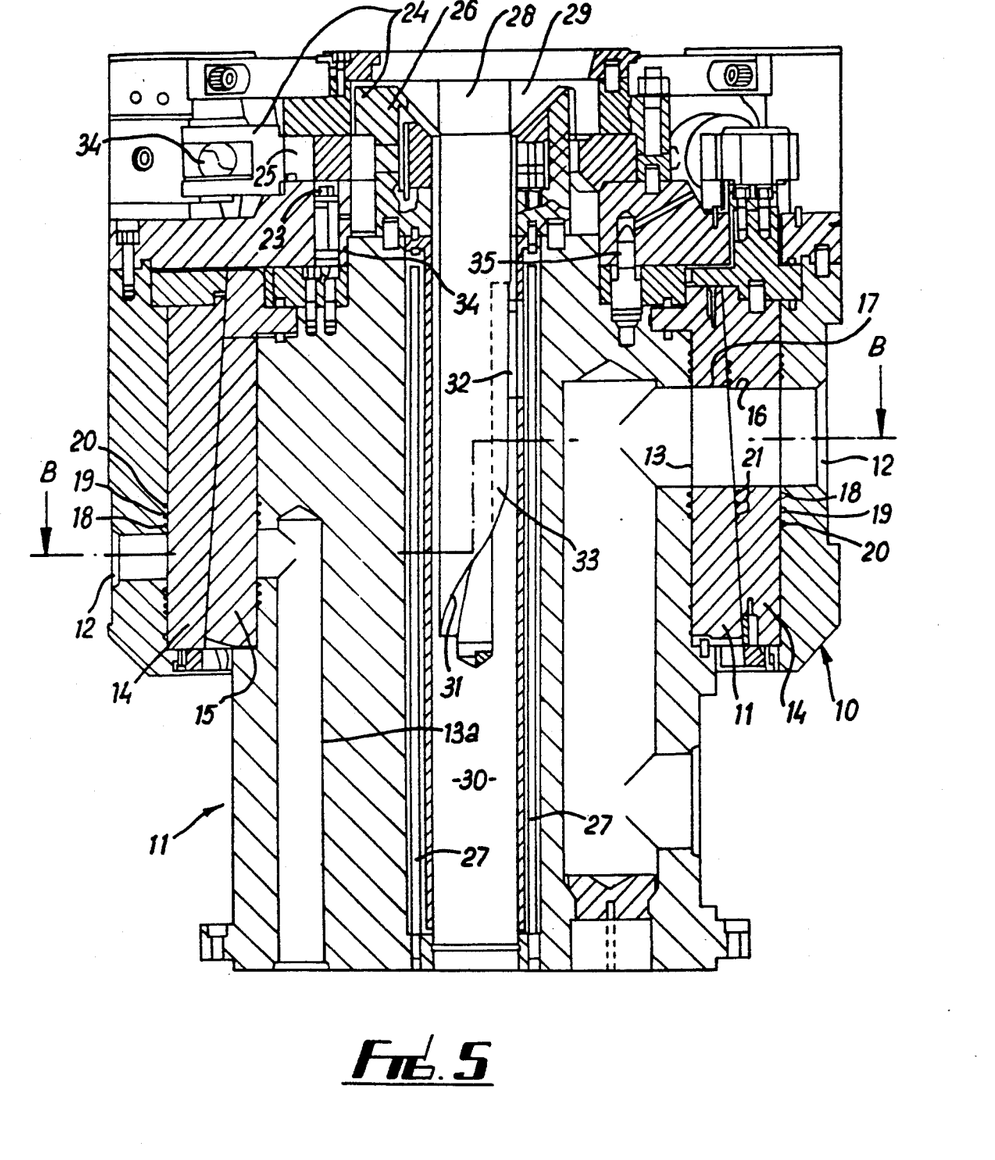
FIG. 5 is a vertical section of the connector taken along line A—A of FIG. 6 showing the connector closed on the left-hand side and open on the right-hand side.
Figure 6:
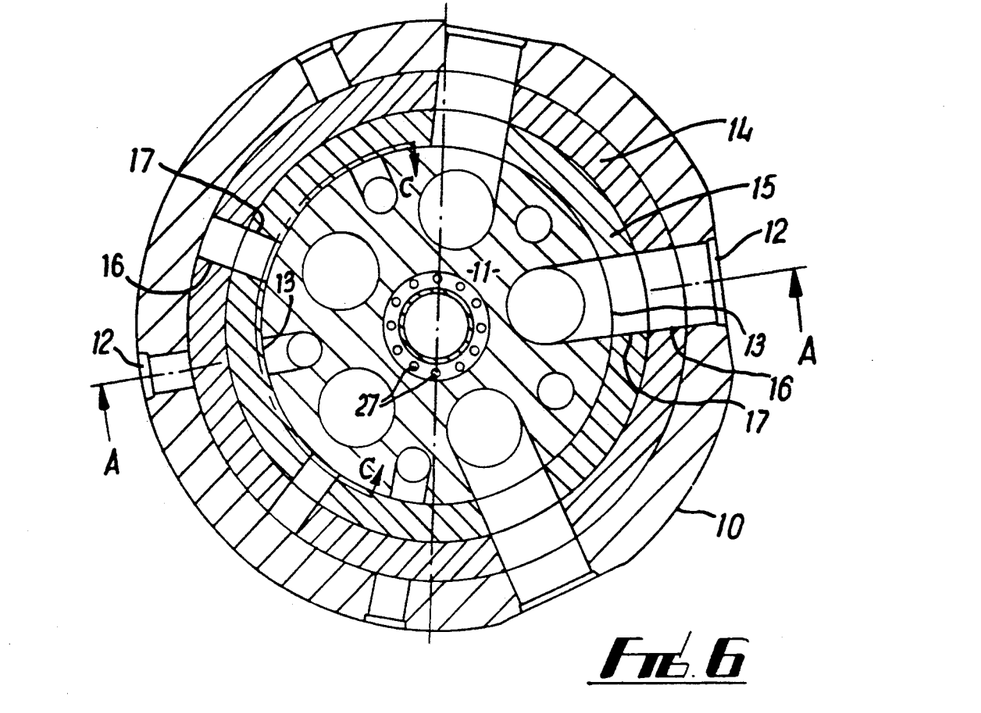
FIG. 6 is a transverse section taken along the line B—B of FIG. 5.

The sleeves 14 and 15 are coupled by means (not shown) for turning movement (also by means not shown) between a first position illustrated in the right-hand sides of FIGS. 5 and 6, in which the aligned ports 16 and 17 align with the bores 12 and 13 respectively, and a second position (illustrated in the left hand sides of FIGS. 5 and 6), in which the ports 16 and 17 are disaligned with the respective bores 12 and 13.

Figure 7:
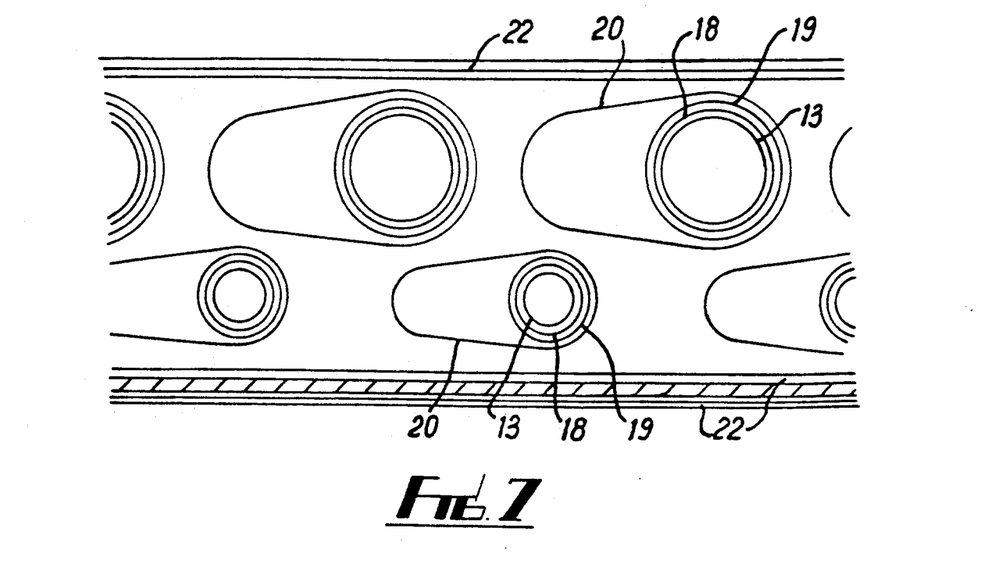
FIG. 7 is a vertical section taken along the line C—C of FIG. 6, FIGS. 8a to 8d show sequential schematic transverse sectional views of the connector during connection of the parts.

A number of seals, as shown in FIGS. 5 and 7, are provided between the bores 12 and sleeve ports 16 of the female part 10 and between the bores 13 and sleeve ports 17 of the male part 11. These seals are located around the bores in each part 10, 11 and consist of a primary seal 18 of annular shape to contain internal pressure, a secondary seal 19 also of annular shape to contain external pressure and a pear-shaped envelope seal 20 to contain internal pressure during alignment-/disalignment of the ports with the bores. Annular seals 21 are also provided between the aligned ports of the two sleeves 14, 15 when the parts 10, 11 are connected. Barrier seals 22 are also provided at each end of the sleeves 14, 15 to prevent spillage to the environment of any leakage from the other seals and to prevent ingress of seawater in the event of greater external pressure existing.

Figures 8A, 8B, 8C, 8D:
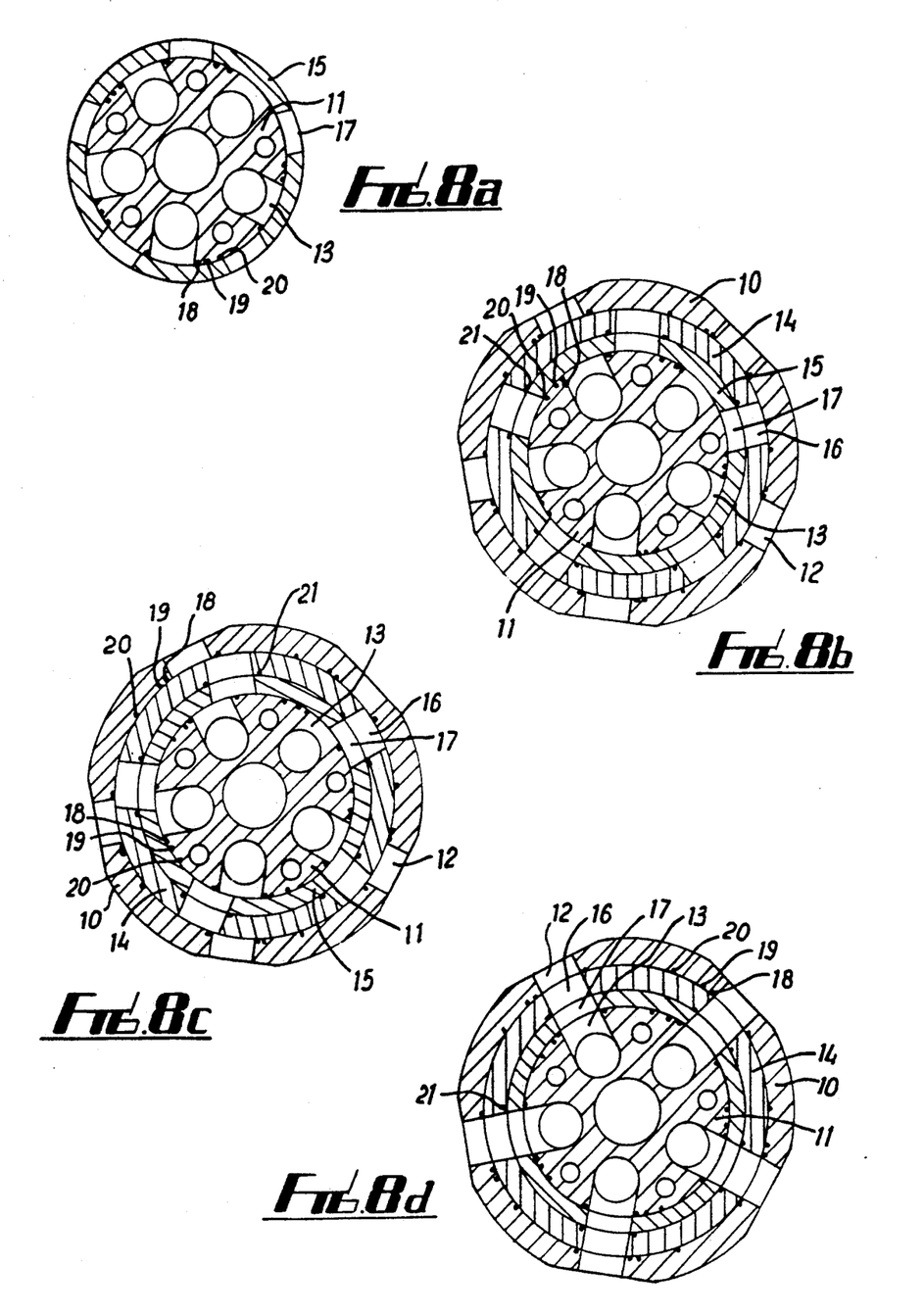

Prior to connection of the two parts 10, 11, both parts are in the "closed" positions, as shown by the left-hand side of FIGS. 5 and 6. The male part 11, as shown in FIG. 8a, is provided with an interlock (not shown) in the form of a locking pin (also not shown) to ensure that the sleeve 15 does not rotate, whilst disconnected, to open the bores 13. In this way, disconnection can be made without spillage of the fluid and the sleeve will be fail safe "locked" or otherwise secured in the bore "closed" position when the two parts are disconnected. During connection of the parts, the female part is lowered over the male part and the two parts are initially held apart by jacking pins 23 to allow filtered water to be flushed through the mating surfaces of the parts to displace may trapped particles of sand, dirt, etc. which may impair the sealing capability. When flushing is complete, a latching mechanism 24 to interengage the parts is operated. The mechanism 24 comprises a cam ring 25 provided on the female part 10 which rotates to engage under lugs 26 on the male part 11, whilst also retracting the jacking pins 23 and delatching the interlock in the male part. The lugs 26 are connected to tension rods 27, which extend longitudinally through the male part and, when the cam ring engages under the lugs, pull the two parts 10, 11 together. The connected parts are thus as shown in FIG. 8b, with the aligned ports 16, 17 out of alignment with the bores 12, 13. An alignment and drive key (not shown) is also provided between the two sleeves 14, 15 to ensure that they always rotate together to maintain alignment of the ports 16, 17.

Whilst the parts 10, 11 remain stationary, the sleeves are then rotated, as shown by FIG. 8c, so that the ports 16, 17 move into alignment with the bores 12, 13 to communicate the bores with each other, thereby enabling fluid to flow through the connector. During rotation of the sleeves, the pear-shaped seals 20 ensure that seals are maintained between the bores and sleeve ports of each of the parts.

FIG. 8d shows the "fully open" position, wherein the bores 12, 13 are intercommunicated by the aligned ports 16, 17, and in this position the annular seals 18 and 21 now contain all the pressure and the pear-shaped seals 20 are not used.

Figure 9:
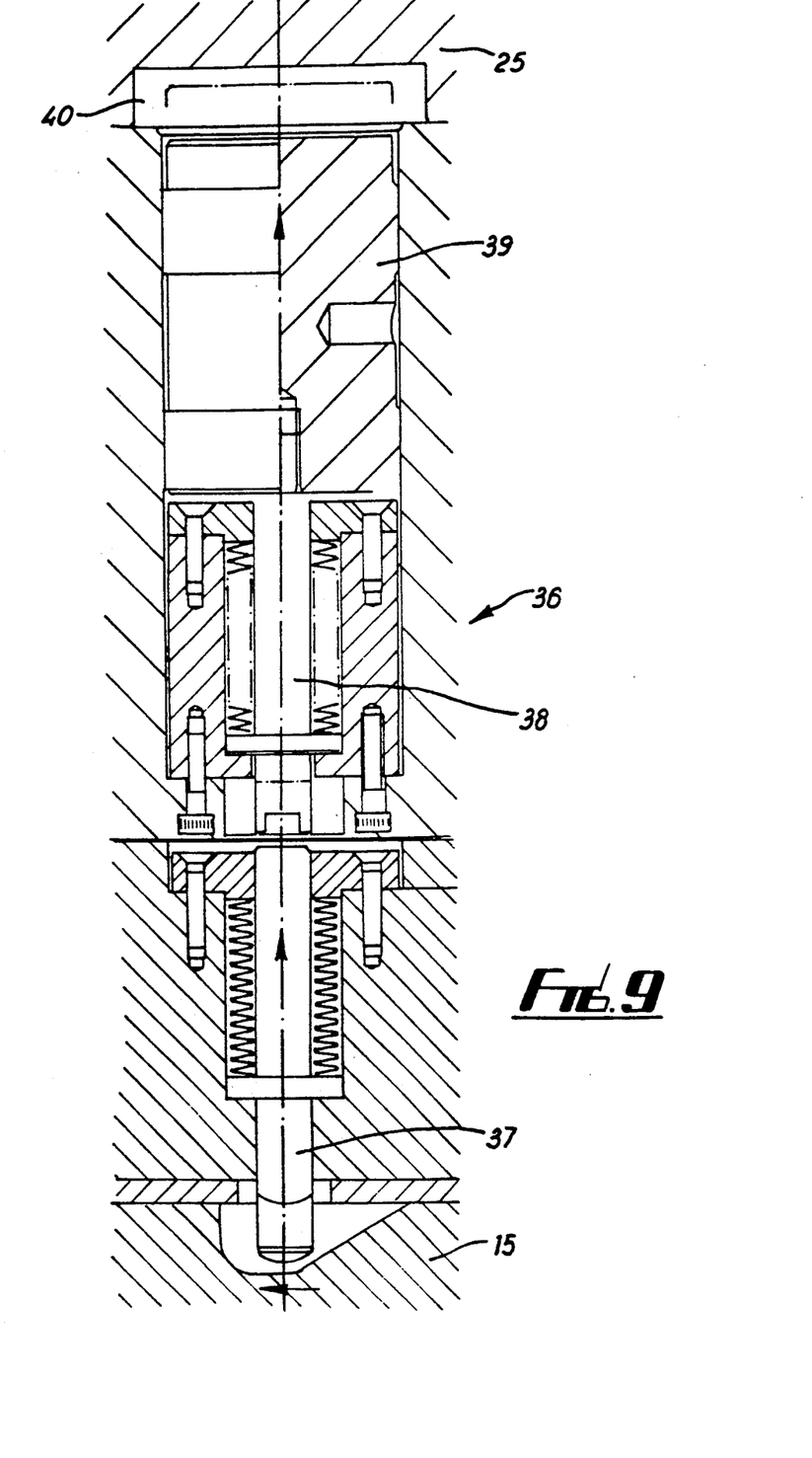
FIG. 9 is an enlarged sectional view of a feature of the connector.

The latching mechanism is then locked in this position by an interlock 36, shown in an enlarged view in FIG. 9, to prevent disconnection of the two parts 10 and 11 when the sleeves 14 and 15 are in the "open" (live) position. The interlock comprises a first spring-loaded pin 37, which is actuated by rotation of the sleeves 14, 15, which in turn actuates a second spring-loaded pin 38, which actuates a shear pin 39 to engage in a hole 40 formed in the cam ring 25. This therefore prevents the cam ring 25 from rotating back to disengage from under the lugs 26.

To disconnect the two parts, the above-described process is simply reversed, firstly by rotating the sleeves back to discommunicate the bores and to unlock the latching mechanism, and secondly by rotation of the latching mechanism to disengage the male and female parts. It will be appreciated that the bores of the two parts will only be "opened" simultaneously, by rotating together the tapered sleeves until the bores and sleeve ports are aligned, after the parts have been interengaged by actuation and subsequent locking of the latching mechanism.

Such latching mechanism is suitably strong to withstand module loadings and side current loadings.

The connector also advantageously includes a guidance and alignment system, which comprises a guide post 28 fixed to the female part 10. The post 28 has a conical end 29, which fits into an entry cone in the male part 11 to provide for misalignment, when the guide post is inserted into the central guide passage 30 of the male part. During insertion, an orientation scroll 31 at the other end of the guide post bears on an alignment key 32 which rotates the female part until the key enters its mating keyslot 33. Fine alignment is then achieved by a spigot 34 and an orientation pin 35.

As can be more readily appreciated from FIG. 5 the bores 13 have axial upstream portions 13a and radial downstream portions 13b disposed at an angle of 90° with respect to the axis of the male part 11.

All actuation functions, such as turning the interlinked sleeves 14 and 15, and latching in both the "open" and "closed" modes are conveniently primarily hydraulic, and such functions preferably have secondary mechanical overrides (not shown) suitable for intervention by remotely operated vehicles (ROVs), or remote maintenance systems (RMS).

All seals of the bores and ports are advantageously provided with porting (not shown) to allow monitoring and pressure integrity testing.

Moreover the male connector part 11 is advantageously suitable for receiving a pressure or corrosion type cap in case of prolonged disconnection.

It will, of course, be understood that all materials are chosen with consideration of subsea environment, line fluids and pysical handling to obtain a connector which will provide minimum cost with maximum reliability.

Furthermore, the connector described is eminently suitable for subsea use and can be sourced as a proprietry item or in a form modified to suit any particular application. The basis of the connector design also enables it to be included in a diverless remotely installable and retrievable modular system.

It should be appreciated that the invention is not limited to the embodiments herein described but includes all modifications and variations falling within its scope, as defined by the appended claims. For example, whilst the described connector has been primarily designed for vertical or substantially vertical connection and disconnection it could be used or adapted to be used for connection at any angle to the vertical, including horizontal connection and disconnection.

Moreover, instead of the cylindrical sleeves 14 and 15 two turnable ported discs of which the ports are aligned and disaligned with axially extending bores in the male and female parts may be used.

In a preferred embodiment, the male and female parts 10 and 11 are urged part by the jacking pins 23 after discommunication of the bores has been completed to facilitate disconnection of the two parts 10 and 11.

Although the connector, in accordance with the present invention, has been described herein in the application of offshore systems, it will be appreciated that it may also be used in equivalent onshore systems for other applications.

We claim:

1. A connector for use in connecting and disconnecting fluid-carrying conduits, comprising a first part having a plurality of bores exiting the first part on a first surface which is a surface of revolution about a central axis of the first part; a second part interconnectable with the first part and having a corresponding plurality of bores exiting the second part on a second surface which is a surface of revolution about a central axis of the second part; the central axes of the first and second parts when interconnected being colinear; obturating means for communicating and discommunicating the bores of the first part with respective bores of the second part, said obturating means comprising a first sleeve member mounted on said first surface for rotary motion thereon between a first position communicating said bores and a second position discommunicating said bores; and interlock means preventing disconnection of the first and second parts except when said first sleeve member is in said second position; whereby the first and second means can be disconnected only when said obturating means discommunicates said bores in said first part from the space exterior to said first part.

2. A connector according to claim 1, in which said obturating means further comprises a second sleeve member mounted on said second surface for rotary motion thereon, and inter-engaging means between said first and second sleeve members when said first and second parts are interconnected to constrain said first and second sleeve members to move in unison.

3. A connector as claimed in claim 2, wherein the connector is of the "plug and socket" type said two parts being complementary male and female parts.

4. A connector as claimed in claim 3, wherein the other surface of the sleeve member of the male part is inwardly tapered and engages with an outwardly tapered surface on the sleeve member of the female part.

5. A connector as claimed in claim 2, in which said bores are located such that each bore of said first part is radially aligned, in use, with the respective bore of said second part, and each of said sleeve members is provided with corresponding ports, such that when the sleeve members are turned together to said first position the ports therein are aligned in pairs with respective first and second part bores to permit fluid flow through the connector, and when the sleeve members are turned together to said second position the ports therein remain aligned in pairs but are disaligned with said respective bores to stop fluid flow through the connector and permit disconnection of the parts.

6. A connector as claimed in claim 5, wherein each part includes a seal between each bore and the sleeve port aligned therewith during connection of the parts which seal is of such a shape as to encompass also both the bore and the port when in their disaligned position.

7. A connector as claimed in claim 6, wherein said seal is pear-shaped in the direction of said rotary motion.

8. A connector as claimed in claim 1, and including a latching mechanism for inter-engaging said first and second parts and providing a predetermined force which pulls together said first and second parts during connection thereof.

9. A connector as claimed in claim 8, wherein the latching mechanism includes cam-shaped projections provided on one part which engage by rotation during connection of the parts with lugs provided on the other part, the lugs being under tension, such that engagement of the projections with the lugs pulls the two parts together.

10. A connector as claimed in claim 9, wherein tension rods are connected to said lugs to provide a tensioning force for the pulling together of the two parts.

11. A connector as claimed in claim 9, wherein said interlock means prevents disengagement of the cam-shaped projections from the lugs until the bores have been discommunicated for subsequent disconnection of the two parts.

12. A connector as claimed in claim 11, wherein said interlock is actuated by rotation of said obturating means.

13. A connector as claimed in claim 1, and including a jacking mechanism for initially maintaining a separation between said two parts, when initially connected, in order to enable the mating surfaces of said two parts to be flushed clean before being latched together.

* * * * *